(12) United States Patent
Oonishi (10) Patent No.: US 9,511,948 B2
(45) Date of Patent: Dec. 6, 2016

(54) CONTROL UNIT FOR CENTRALIZING CONTROL BY GROUPING A PLURALITY OF PATHS

(71) Applicant: FANUC Corporation, Minamitsuru-gun, Yamanashi (JP)

(72) Inventor: Yuuki Oonishi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 160 days.

(21) Appl. No.: 14/471,507

(22) Filed: Aug. 28, 2014

(65) Prior Publication Data

US 2015/0066203 A1 Mar. 5, 2015

(30) Foreign Application Priority Data

Sep. 3, 2013 (JP) .................................. 2013-182523

(51) Int. Cl.
*G06F 7/00* (2006.01)
*B65G 43/00* (2006.01)
*G05B 19/00* (2006.01)
*G05B 19/418* (2006.01)

(52) U.S. Cl.
CPC ............... *B65G 43/00* (2013.01); *G05B 19/00* (2013.01); *G05B 19/41865* (2013.01); *G05B 2219/1215* (2013.01); *G05B 2219/31281* (2013.01); *G05B 2219/40405* (2013.01); *Y02P 90/08* (2015.11); *Y02P 90/20* (2015.11); *Y02P 90/28* (2015.11)

(58) Field of Classification Search
None
See application file for complete search history.

(56) References Cited

U.S. PATENT DOCUMENTS

| | | | |
|---|---|---|---|
| 5,092,451 A * | 3/1992 | Jones | B65G 43/08 198/444 |
| 5,136,339 A * | 8/1992 | Morita | G03G 15/6502 271/127 |
| 6,112,655 A * | 9/2000 | Suzuki | B41L 21/02 101/118 |
| 8,355,159 B2 * | 1/2013 | Dobbertin | G03G 15/5008 318/34 |
| 2001/0018872 A1 * | 9/2001 | Tokiwa | B41F 13/0045 101/221 |
| 2004/0039476 A1 | 2/2004 | Iihoshi et al. | |
| 2015/0259144 A1 * | 9/2015 | Hershfeld | B31B 1/88 347/104 |

FOREIGN PATENT DOCUMENTS

JP 2004-086306 A 3/2004

* cited by examiner

*Primary Examiner* — Prasad Gokhale
(74) *Attorney, Agent, or Firm* — Drinker Biddle & Reath LLP (57) ABSTRACT

The control of second to fourth paths (slave paths) is performed with reference to various settings and the sequence of the first path (master path), instead of various settings and sequences of the second to fourth paths, thus, control of all path groups is centralized by the sequence of the first path.

7 Claims, 11 Drawing Sheets

<BEFORE CHANGING MACHINE STRUCTURE>

FIG. 7B

<AFTER CHANGING MACHINE STRUCTURE>

FIG. 8

|  | FIRST PATH | SECOND PATH | THIRD PATH | FOURTH PATH | FIFTH PATH |
|---|---|---|---|---|---|
| BEFORE CHANGING MACHINE STRUCTURE | 1 | 1 | 1 | 1 | 0 |
| AFTER CHANGING MACHINE STRUCTURE | 1 | 1 | 1 | 1 | 1 |

FIG. 9

| BEFORE CHANGING MACHINE STRUCTURE | PATH GROUP SETTING SIGNAL (8 bit) = 00001111 |
|---|---|
| AFTER CHANGING MACHINE STRUCTURE | PATH GROUP SETTING SIGNAL (8 bit) = 00011111 |

FIG. 10

(COMMAND FOR MAKING SETTING BEFORE CHANGING MACHINE STRUCTURE)   Gxx M1 S2 S3 S4 ;

(COMMAND FOR MAKING SETTING AFTER CHANGING MACHINE STRUCTURE)   Gxx M1 S2 S3 S4 S5 ;

FIG. 11A

<BEFORE CHANGING MASTER (MASTER: BELT CONVEYER)>

FIG. 11B

<AFTER CHANGING MASTER (MASTER: LOADER SYSTEM)>

FIG. 12

|  | FIRST PATH | SECOND PATH | THIRD PATH | FOURTH PATH | FIFTH PATH |
|---|---|---|---|---|---|
| BEFORE CHANGING MASTER | 1 | 0 | 0 | 0 | 0 |
| AFTER CHANGING MASTER | 0 | 0 | 0 | 0 | 1 |

FIG. 13

| BEFORE CHANGING MASTER | MASTER PATH SETTING SIGNAL (8 bit) = 00000001 |
|---|---|
| AFTER CHANGING MASTER | MASTER PATH SETTING SIGNAL (8 bit) = 00010000 |

FIG. 14

(COMMAND FOR MAKING SETTING BEFORE CHANGING MASTER)    Gxx M1 S2 S3 S4;

(COMMAND FOR MAKING SETTING AFTER CHANGING MASTER)    Gxx M5 S2 S3 S4;

CONTROL UNIT FOR CENTRALIZING CONTROL BY GROUPING A PLURALITY OF PATHS

RELATED APPLICATION DATA

This application claims priority under 35 U.S.C. §119 and/or §365 to Japanese Application No. 2013-182523 filed Sep. 3, 2013, the entire contents is incorporated herein by reference.

BACKGROUND OF THE INVENTION

1. Field of the Invention

The present invention relates to a control unit that centralizes control by grouping a plurality of paths.

2. Description of the Related Art

Figure 21:
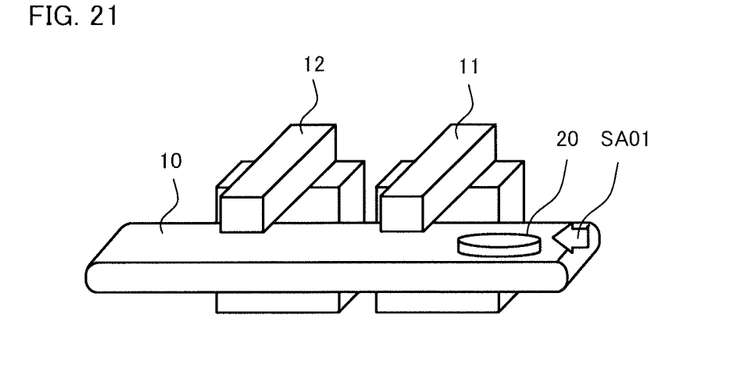
FIG. 21 shows a system including a belt conveyer and two marking machines.

FIG. 21 shows a system including a belt conveyer and a plurality of marking machines. This system includes a belt conveyer 10, a first marking machine 11, a second marking machine 12, and a control unit (not shown) that controls the belt conveyer 10, the first marking machine 11, and the second marking machine 12. This system performs marking at a predetermined position of a target object 20 conveyed by the belt conveyer 10 in a movement direction 21. The operation pace of the entire system depends on the pace of belt conveyer 10 and the marking machines 11 and 12 operate at an assigned timing.

When the entire system is controlled by one path and one sequence program, if the belt conveyer 10 is instructed to set the pace of the entire system to 50%, the marking machines 11 and 12 operate at a pace of 50%, thereby ensuring the operation timings of the belt conveyer 10 and the marking machines 11 and 12.

Japanese Patent Application Laid-Open No. 2004-86306 discloses a multipath numerical control unit that solely controls a machine tool for performing a plurality types of machining or machining and other types of work, such as turning, milling, loader control, and so on. As disclosed in Japanese Patent Application Laid-Open No. 2004-86306, when different types of control are performed concurrently, a method of dividing the system into a plurality of paths and operating the individual paths independently in parallel has been used. In addition, while the individual paths are independently operated normally, they are operated coordinately with each other as needed, thereby enhancing versatility of the system.

Since the entire system is controlled by one path in the system shown in FIG. 21, the independence of individual components is lost. In addition, if the system structure or machining instructions are changed even partially, the control of the entire sequence program needs to be changed, thereby expending much effort.

If the system is controlled by a plurality of paths and a plurality of sequence programs, the independence of the individual components is maintained. Accordingly, if the system structure or machining instructions are changed partially, the control of the necessary part only needs to be changed, thereby enabling flexible responses. However, since the system is controlled by a plurality of paths, if the belt conveyer is instructed to operate at a pace of 50%, the control needs to be changed so that the individual marking machines operate at a pace of 50% (that is, so that the plurality of sequence programs are coordinated/with each other), thereby expending much effort in constructing the system.

Although the sequence programs for controlling a plurality of paths need to be coordinated with each other to achieve cooperation between the plurality of paths as described above, the creation of the coordinated sequence programs is difficult. In addition, since the coordinated sequence programs need to be changed when the system structure is changed, a lot of time needs to be spent each time the system structure is changed.

SUMMARY OF THE INVENTION

An object of the present invention is to provide a control unit that coordinates the slave paths with the master path, in which a plurality of slave paths are controlled through the control of a master path, the coordination between paths is easy, and flexible responses without changing the sequence programs of slave paths is achieved even if the system structure is changed.

A plurality of paths are collectively defined as a path group. In the path group, only one path is specified as a master path and the other paths are specified as slave paths. The slave paths are controlled with reference to control data, such as parameters and signals, in the master path instead of the slave paths.

Therefore, if control such as, for example, an override is performed on the master path, the entire path group is affected accordingly. As a result, only if control data of the master path is changed, control of many other paths can be centralized.

The control unit according to the present invention that controls a plurality of paths and has a plurality of command analysis units configured to control a machine having a plurality of shafts driven by a motor, a plurality of command execution units configured to execute a command analyzed by the plurality of command analysis units, and a path setting unit configured to set one or more controls of the plurality of shafts controlled by a program, includes a path group setting unit configured to select two or more paths from the plurality of paths and set the two or more paths as a path group, a master path selection unit configured to select one path of the path group as a master path, which is referred to as an operation reference, and classify the other paths of the path group as slave paths, and a control information storage unit configured to store, as master control information, the program required to control the master path and control data including a signal and a parameter concerning control of the program, in which the slave paths are configured to be controlled with reference to the master control information, so that the slave paths are operated so as to be coordinated with the master path.

The path group setting unit may set and change the path group at an arbitrary timing using a parameter, a signal, or a program.

The master path selection unit may set and change the master path at an arbitrary timing using a parameter, a signal, or a program.

The master path selection unit may form a master-slave multi-layered structure by selecting a master path from a plurality of master paths.

Since the control unit with the above structure of the present invention can control the plurality of slave paths through the control of a master path, coordination between paths becomes easy, thereby enabling a flexible response without changing the sequence programs of the slave paths even if the system structure is changed.

BRIEF DESCRIPTION OF THE DRAWINGS

These and other objects and features of the present invention will become apparent from the following descrip

DETAILED DESCRIPTION OF THE PREFERRED EMBODIMENTS

In the following description, the components that are the same as or similar to those of the prior art technique are given the same reference characters.

Embodiment 1

Figure 1:
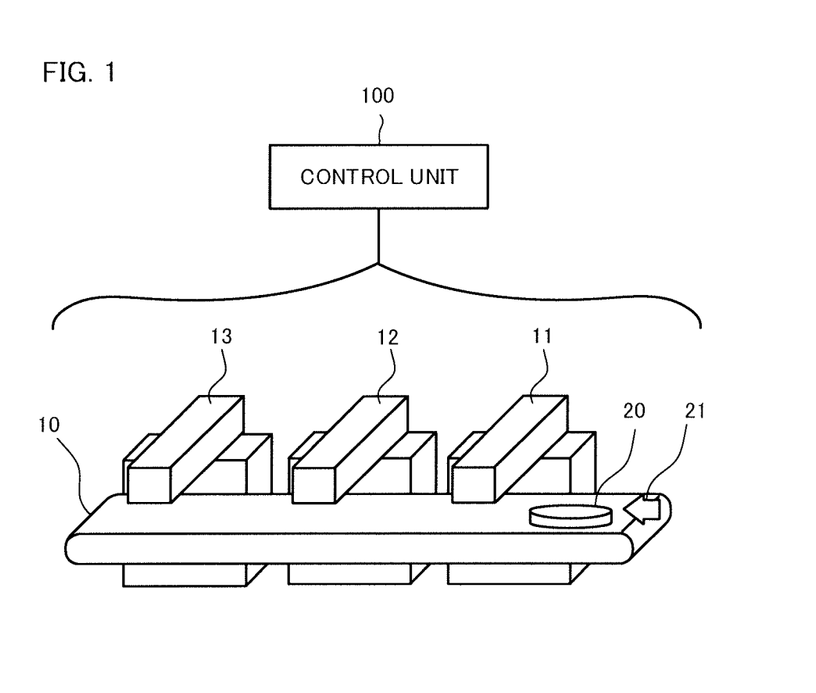
- FIG. 1 shows a system including a belt conveyer and three marking machines.

A system including a belt conveyer and three marking machines shown in FIG. 1 will be described as an example. This system includes the belt conveyer 10, the first marking machine 11, the second marking machine 12, a third marking machine 13, and a control unit 100 that controls the belt conveyer 10, the first marking machine 11, the second marking machine 12, and the third marking machine 13.

For example, when the speed of the belt conveyer 10 changes at an arbitrary timing, the first to third marking machines 11, 12, and 13 also need to change their speeds in sync with the belt conveyer 10. If the first to third marking machines 11, 12, and 13 do not change their speed, they cannot perform marking at correct positions.

Figure 2:
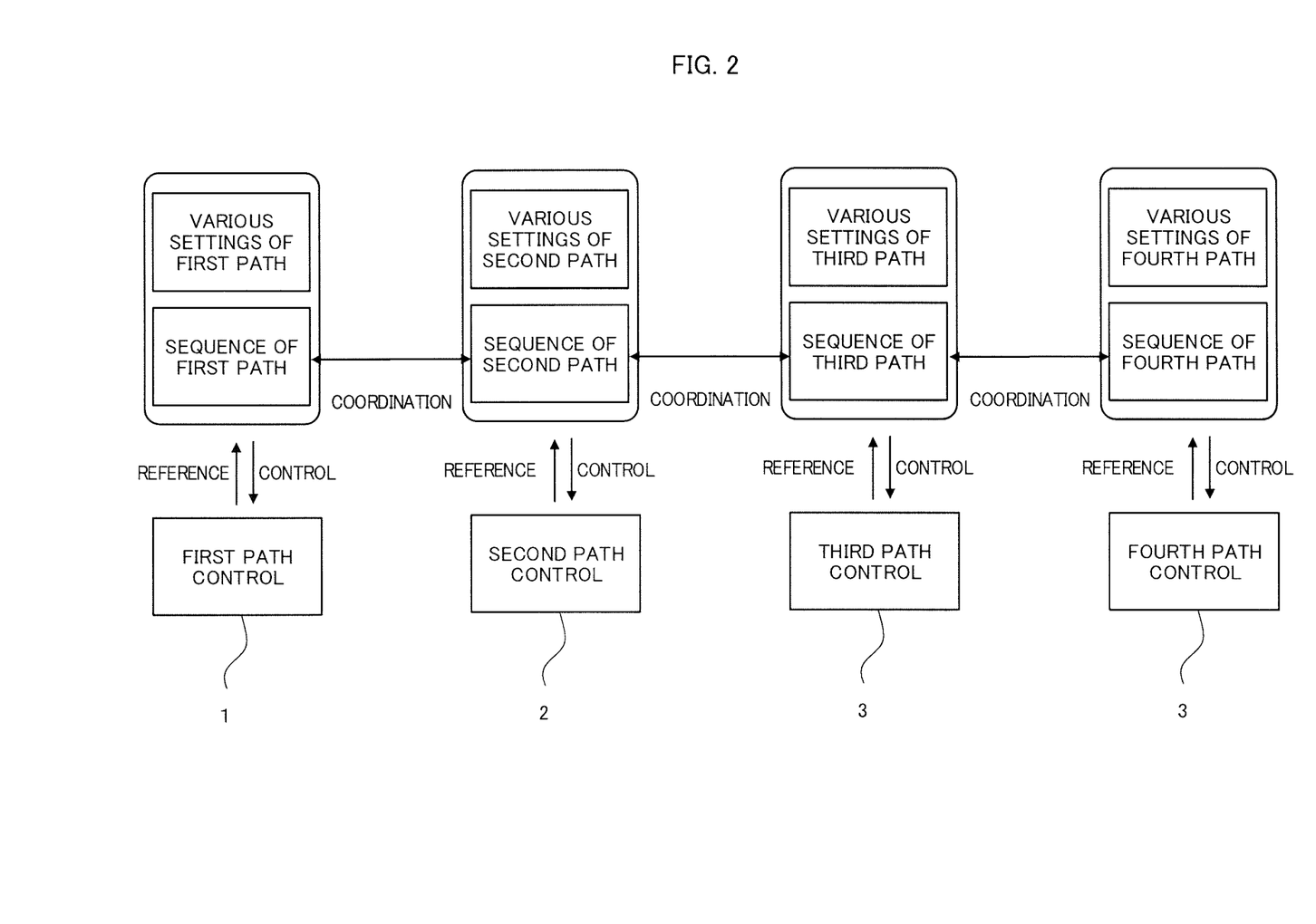
FIG. 2 shows an example of path control in which synchronized speed changes are enabled, but creation of a sequence program is labor-intensive in the system shown in FIG. 1.

As shown in FIG. 2, if first path control 1 is set to control the belt conveyer 10 and second path control 2, third path control 3, and fourth path control 4 are set to control a first marking machine 11, a second marking machine 12, and a third marking machine 13, respectively, then synchronized speed changes are enabled by various settings and creation of a sequence program for performing coordination between paths, but creation of processes is labor-intensive.

Figure 3:
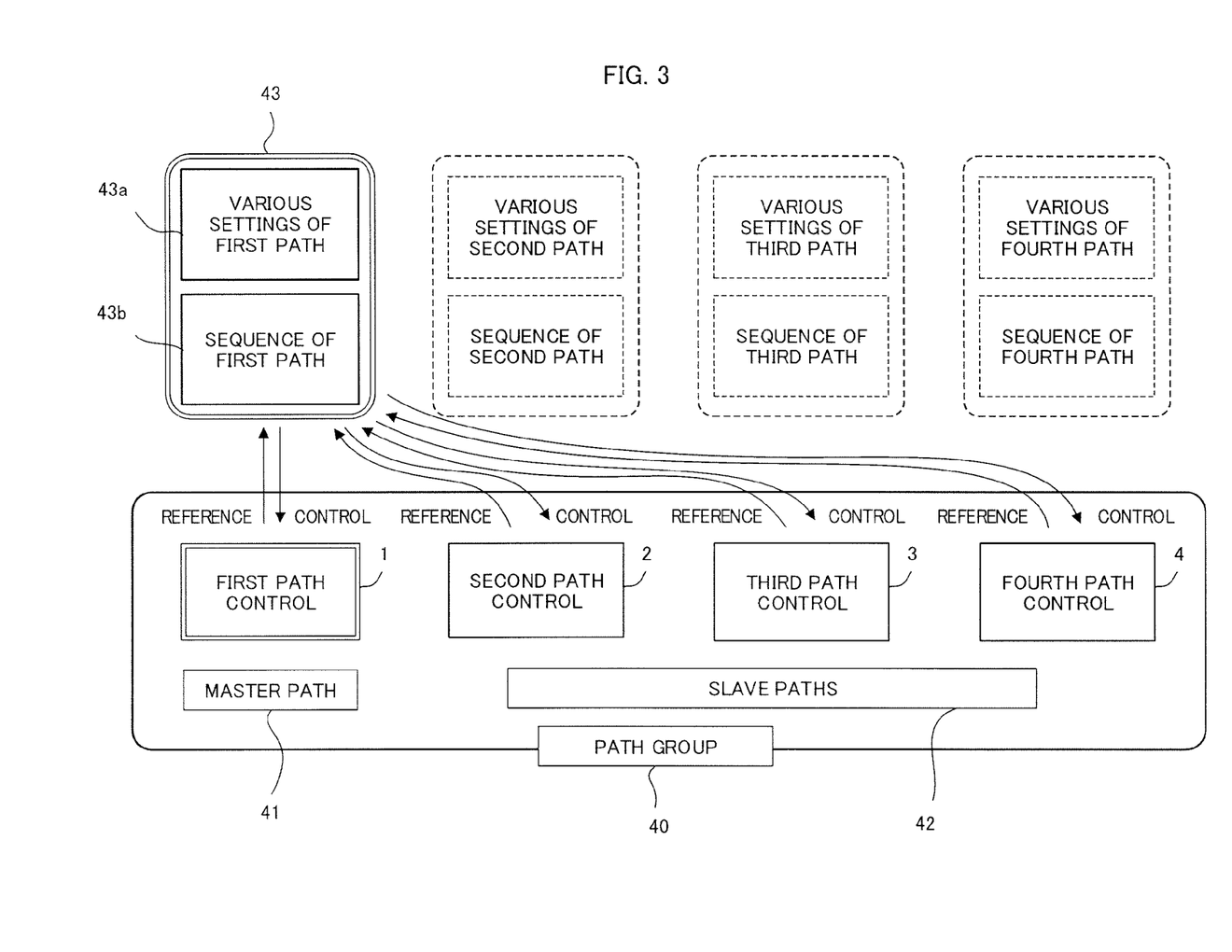
FIG. 3 shows how the speed of the three marking machines, which are slave paths, can be changed in sync with speed changes of the belt conveyer, which is a master path, by the sequence program in the system shown in FIG. 1.

Accordingly, first to fourth paths are integrated into a path group and the first path is set as the master path in the path group. FIG. 3 shows how the speed of the first to third marking machines 11, 12, and 13, which are slave paths 42, can be changed in sync with speed changes by the sequence program of the belt conveyer 10, which is a master path 41 in the system shown in FIG. 1.

The second path control 2, the third path control 3, and the fourth path control 4, which are the slave paths 42, are thereby executed with reference to various settings 43a of the first path (the master path 41) and a sequence 43b of the first path (the master path 41) instead of the second to fourth paths. That is, the entire path group 40 can be centralized by the sequence 43b of the first path and the speeds of the first to third marking machines 11, 12, and 13, which are the slave paths 42, can be easily changed in sync with speed changes of the belt conveyer 10, which is the master path 41, caused by a sequence program.

Figure 4:
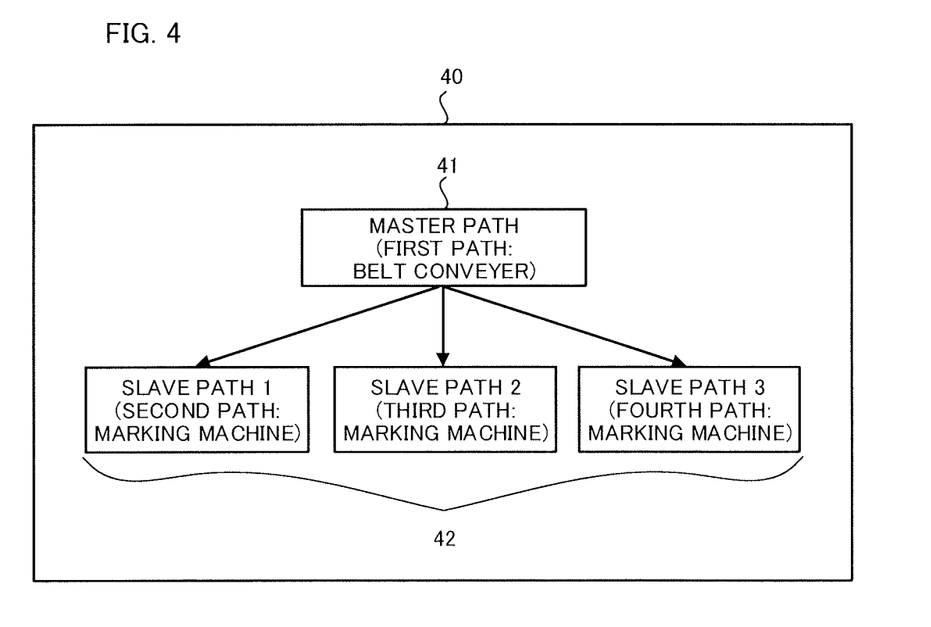
FIG. 4 shows the structure of a path group.

FIG. 4 shows the structure of a path group. Since the slave paths refer to changes in the speed of the first path, which is the master path, the slave paths operate integrally with the first path. In the path group 40, the master path 41 is the belt conveyer 10 of the first path, a slave path (1) included in the slave paths 42 is the first marking machine 11 of the second path, a slave path (2) is the second marking machine 12 of the third path, and a slave path (3) is the third marking machine 13 of the fourth path.

Figure 5:
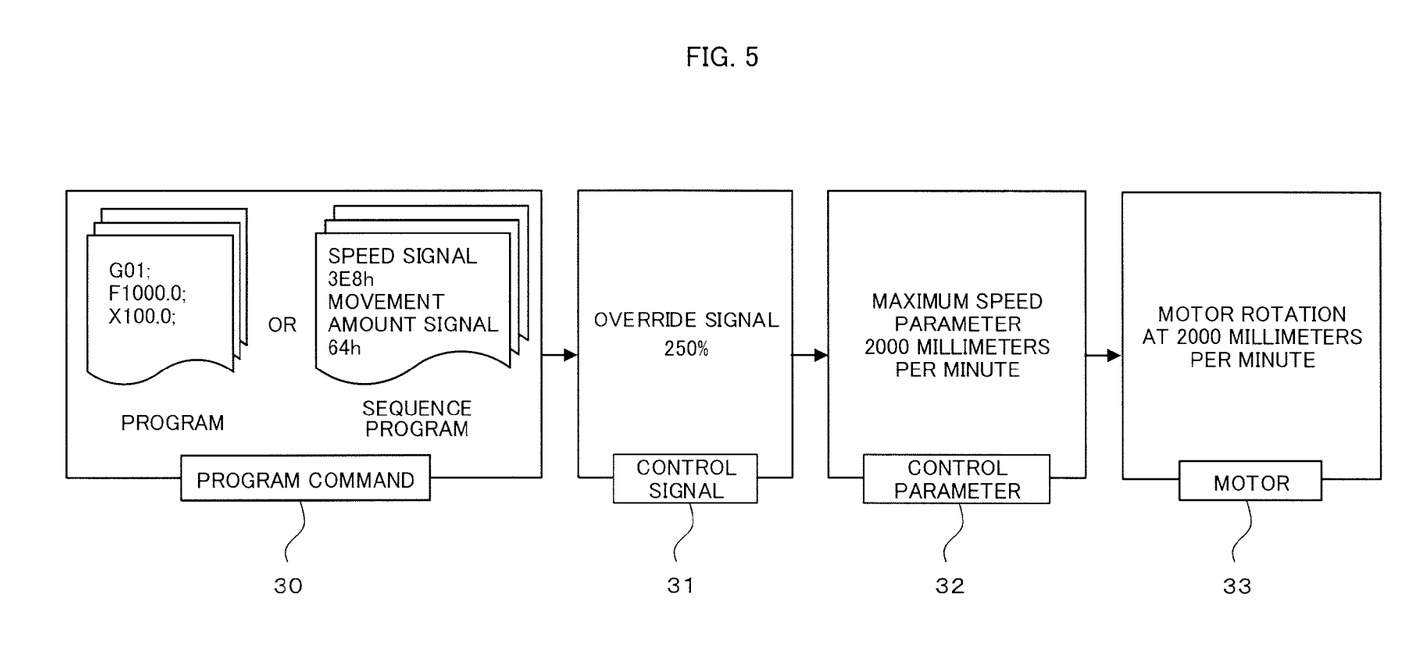
FIG. 5 shows conventional path control.

FIG. 5 shows conventional path control. Conventionally, a control signal 31 and a control parameter 32 finally control the rotation of a motor 33 beginning with a program command 30 for each path. Accordingly, if the individual paths are not synchronously controlled as described above, the entire system does not operate correctly. Note that the program for this program command is a text format program statement or sequence program.

EXAMPLE

For a program command that moves a shaft at 1000 millimeters per minute, when there is a setting for an override control signal that increases the speed to 250% and performs execution and a setting of a parameter for limiting the maximum speed to 2000 millimeters per minute, the shaft moves at 2000 millimeters per minute as a result of analyzing these settings.

In the example shown in FIG. 5, the following input, conversion, limitation, and output are performed. Program command analysis: A speed command of 1000 millimeters per minute is input.

Control signal analysis: The speed command is changed to 2500 millimeters per minute.

Control parameter analysis: The speed command is limited to 2000 millimeters per minute.

Final output: The axis of motor rotates at 2000 millimeters per minute.

Figure 6:
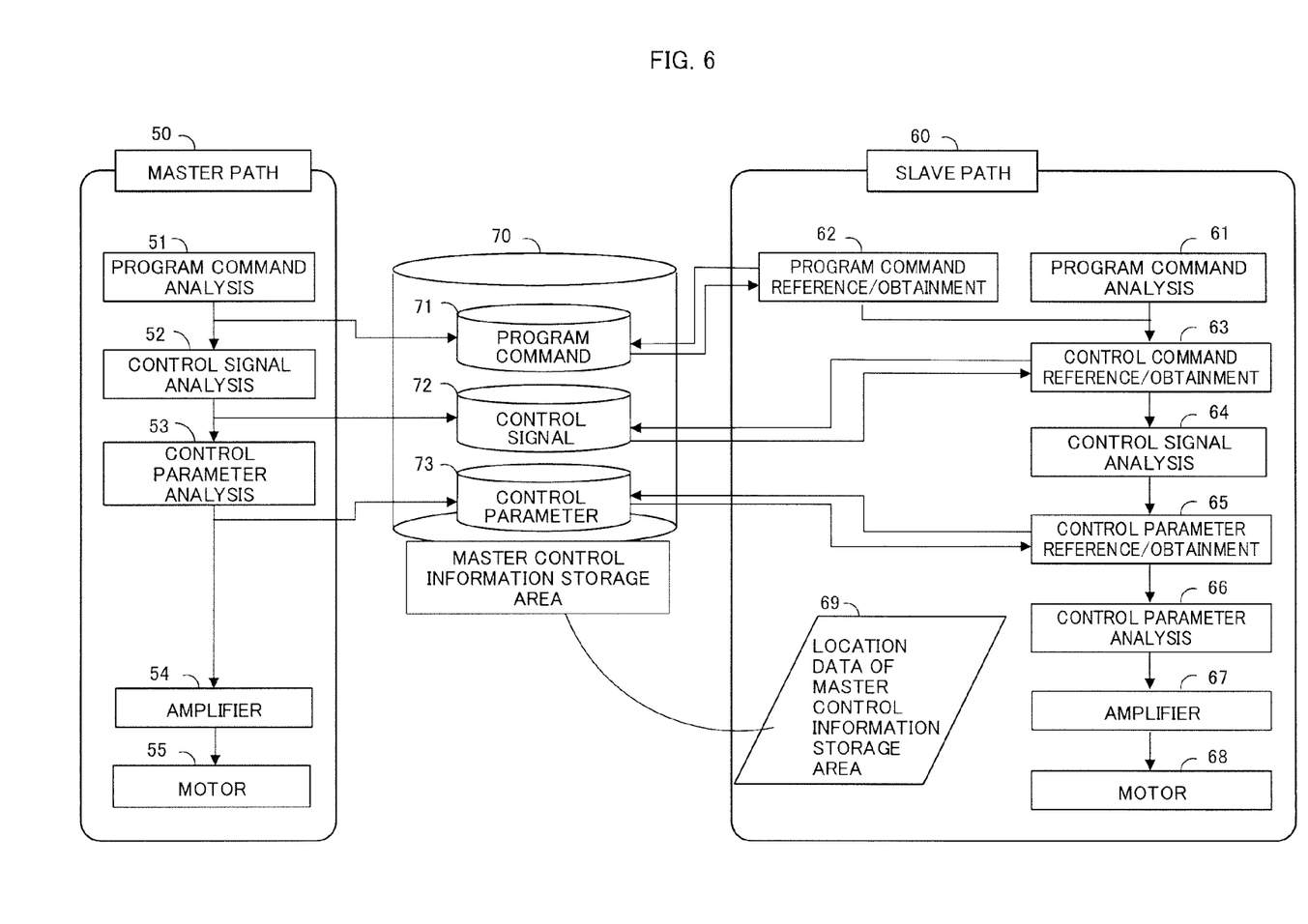
FIG. 6 shows path control according to an embodiment of the present invention.

FIG. 6 shows path control according to the embodiment of the present invention. This path control is performed by a control unit that controls a machine tools or industrial machine. As a method of specifically achieving a system in which slave paths operate according to a master path in a path group, a master path 50 in the path group stores control information in a master control information storage area 70 and a slave path 60 of slave paths in the path group performs control with reference to the control information of the master path 50 stored in the master control information storage area 70.

More specifically, the master path 50 performs program command analysis 51, control signal analysis 52, and control parameter analysis 53 and, based on a program command, control signal, and control parameter, drives and controls a motor 55 via an amplifier 54. At this time, the master path 50 stores a program command 71, a control signal 72, and a control parameter 73 in the master control information storage area 70.

The slave path 60 checks whether the program command 71 is stored in the master control information storage area 70, while executing a program command analysis 61. If the program command 71 is stored, the slave path 60 obtains the program command 71 (as shown in 62).

The slave path 60 checks whether the control signal 72 is stored in the master control information storage area 70. If the control signal 72 is stored, the slave path 60 obtains the control signal 72 (as shown in 63). The slave path 60 analyzes the obtained control signal 72 using the control signal analysis 64.

The slave path 60 checks whether the control parameter 73 is stored in the master control information storage area 70. If the control parameter 73 is stored, the slave path 60 obtains the control parameter 73 (as shown in 65). The slave path 60 analyzes the obtained control parameter 73 using control parameter analysis 66. The slave path 60 dives a motor 68 via an amplifier 67 based on the analysis result.

The slave path 60 can obtain the program command 71, the control signal 72, and the control parameter 73 from the master control information storage area 70 based on master control information storage area location data 69.

Embodiment 2

The machine structure may be changed depending on the use situation of the machine. For example, although the three marking machines are present in the machine structure shown in embodiment 1 above, the number of marking machines required may be increased or reduced because, for example, the target object is changed.

Figure 7A:
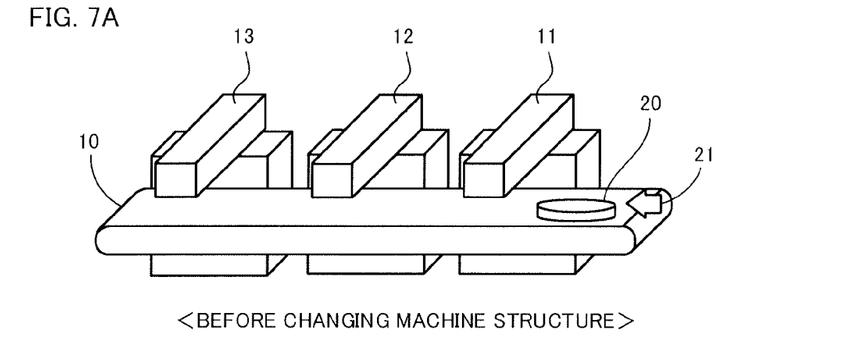
FIG. 7A shows the machine structure before being changed.
Figure 7B:
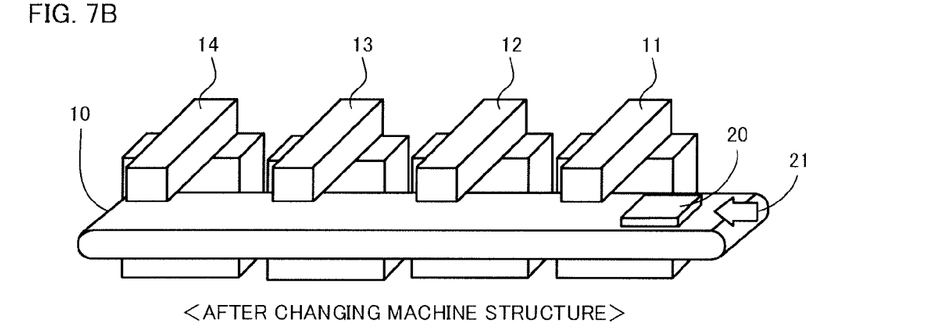
FIG. 7B shows the machine structure after being changed.

FIG. 7A shows the machine structure before being changed and FIG. 7B shows the machine structure after being changed. It is assumed that there are the belt conveyer 10 and the first to third marking machines 11, 12, and 13 as shown in FIG. 7A before the machine structure is changed and that there are the belt conveyer 10 and the first to fourth marking machines 11, 12, 13, and 14 as shown in FIG. 7B after the machine structure is changed. In this case, a change in the machine structure can be easily adjusted by changing the settings of the pass group and adding a slave path.

[Before Change]
  Path group: first to fourth paths
  Master path: first path (belt conveyer)
  Slave paths: second to fourth paths (three marking machines)
[After Change]
  Path group: first to fifth paths
  Master path: first path (belt conveyer)
  Slave paths: second to fifth paths (four marking machines)

Figure 8:
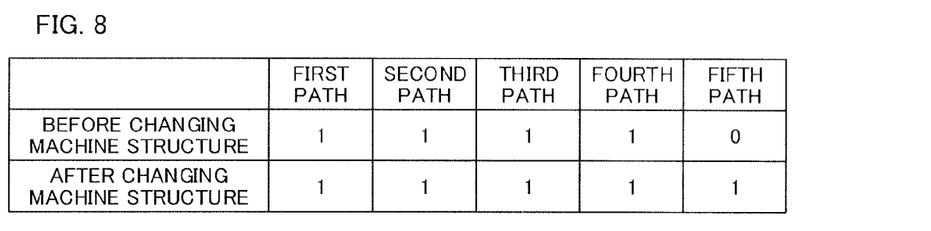
FIG. 8 shows the setting of a path group using parameters.
Figure 9:
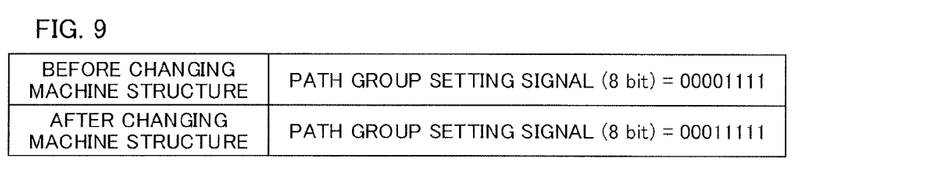
FIG. 9 shows the setting of a path group using signals.
Figure 10:
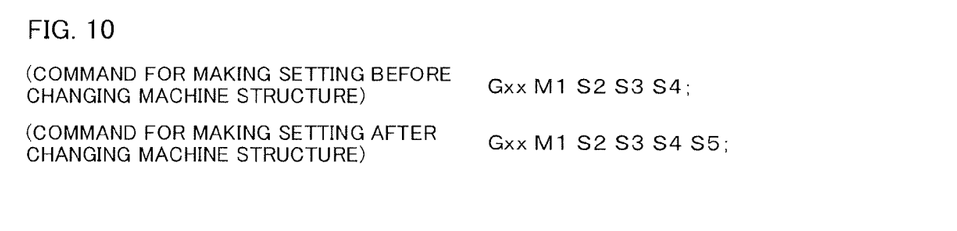
FIG. 10 shows the setting of a path group using a program.

The setting of a path group and the changing of the setting can be performed by parameters, signals, and a program as shown in FIGS. 8, 9, and 10.

[Parameter] Sets a path group number (see FIG. 8).
[Signal] Sets the bits corresponding to the path numbers of paths to be set in a path group to 1 (see FIG. 9).
[Program] Executes a path group setting command (see FIG. 10).

An M command is issued for the path number to be set for the master path and S commands are issued for the path numbers to be set for slave paths (see FIG. 10).

Embodiment 3

The master path may be changed depending on the situation. For example, the machine structure shown in embodiment 1 above includes the belt conveyer 10 and the first to third marking machines 11, 12, and 13 and perform marking of the target object 20 three times in sequence. If only the required marking is performed in an arbitrary order, a loader system 15 may be used as the master path instead of the belt conveyer 10. In such a case, a change in the machine structure may be easily adjusted by changing the setting of a path group and changing the master path.

Figure 11A:
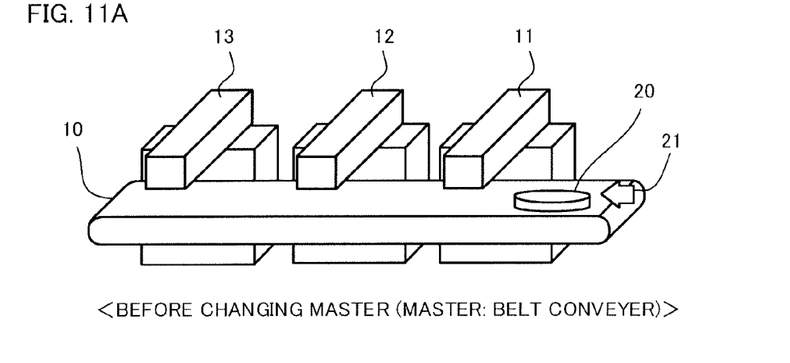
FIG. 11A shows the structure before changing the master.
Figure 11B:
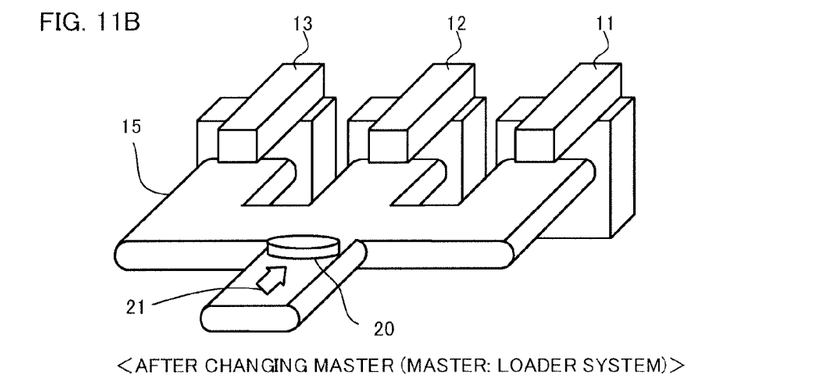
FIG. 11B shows the structure after changing the master.

FIG. 11A shows the structure before changing the master and FIG. 11B shows the structure after changing the master. The following description assumes an example in which the first path is set to control the belt conveyer, the second to fourth paths are set to control the first to third marking machines, and the fifth path is set to control a loader system.

[Before Change]
  Path group: first to fourth paths
  Master path: first path (belt conveyer)
  Slave paths: second to fourth paths (three marking machines)
[After Change]
  Path group: second to fifth paths
  Master path: fifth path (loader system)
  Slave paths: second to fourth paths (three marking machines)

The setting of the master path can be changed by parameters, signals, and a program.

Figure 12:
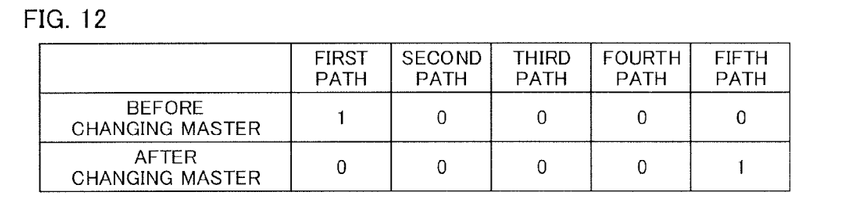
FIG. 12 shows the setting of the master path using parameters.
Figure 13:
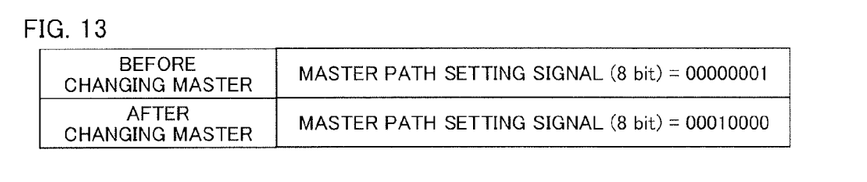
FIG. 13 shows the setting of the master path using signals.
Figure 14:
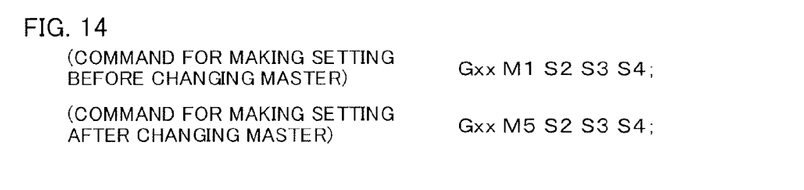
FIG. 14 shows the setting of the master path using a program.

[Parameter] Changes the setting of the master path (see FIG. 12).
[Signal] Sets the bit corresponding to the path number of the master path to 1 (see FIG. 13).
[Program] Executes a path group setting command (see FIG. 14).

An M command is issued for the path number to be set for the master path and S commands are issued for the path numbers to be set for slave paths (see FIG. 14).

Embodiment 4

Figure 15:
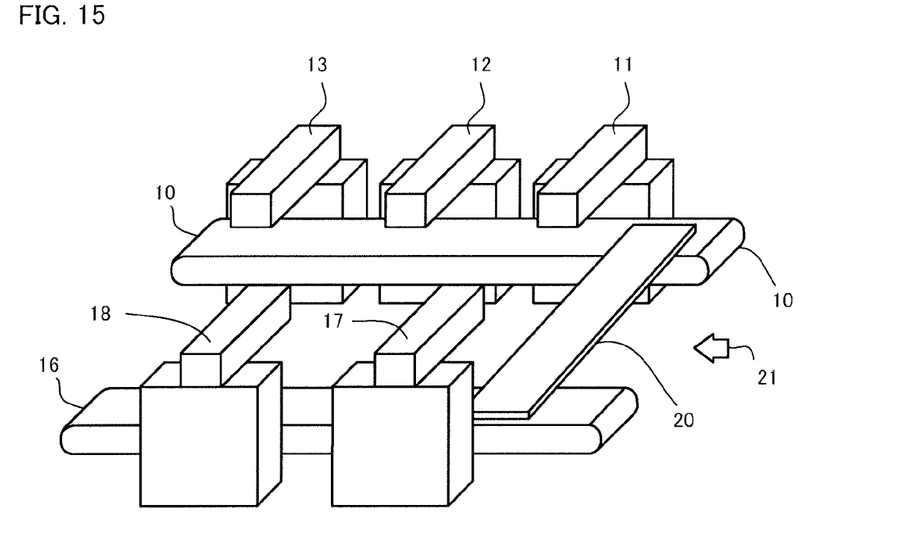
FIG. 15 shows integration of a plurality of path groups into one.

A plurality of path groups are integrated into one path group depending on the situation. For example, in the machine structure shown in embodiment 1 above, the path group includes the belt conveyer and the three marking machines. However, an exemplary system descried below performs marking on both sides of a long target object through cooperation between path group 1 (the master path is the first path and the slave paths are the second to fourth paths) on the far side and path group 2 (the master path is the fifth path and the slave paths are the sixth and seventh paths) on the near side, as shown in FIG. 15.

Since the target object 20 may drop if the timing of path group 1 does not match the timing of path group 2 in this case, path group 1 needs to be coordinated with path group 2.

If a master path is further selected from the two master paths of path groups 1 and 2 and then the two path groups are integrated into one path group, then centralized control using the master path at the highest level of the hierarchical structure is enabled and the coordination between timings is easily achieved since the entire path group is controlled according to the timing of the master path at the highest level.

The structure of a path group will be described with reference to the drawings.

Setting of a master path among master paths achieves a master-slave multi-layered structure.

Figure 16:
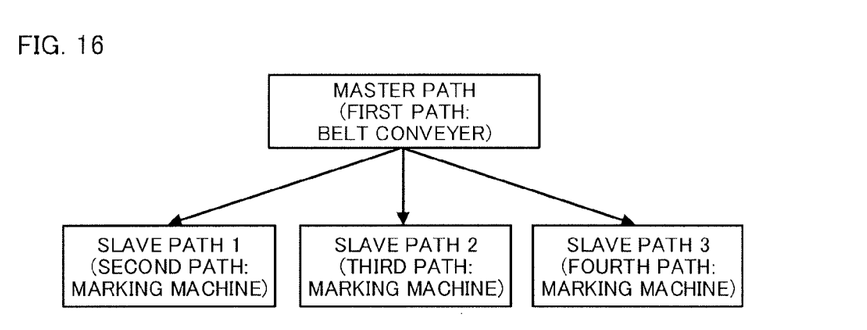
FIG. 16 shows an original path group 1.

Original path group 1 (the master path is the first path and the slave paths are the second to fourth paths) (see FIG. 16)

Figure 17:
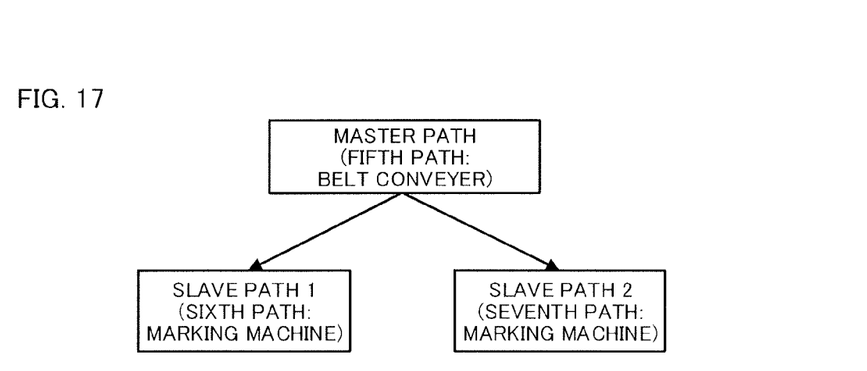
FIG. 17 shows an original path group 2.

Original path group 2 (the master path is the fifth path and the slave paths are the sixth and seventh paths) (see FIG. 17)

Figure 18:
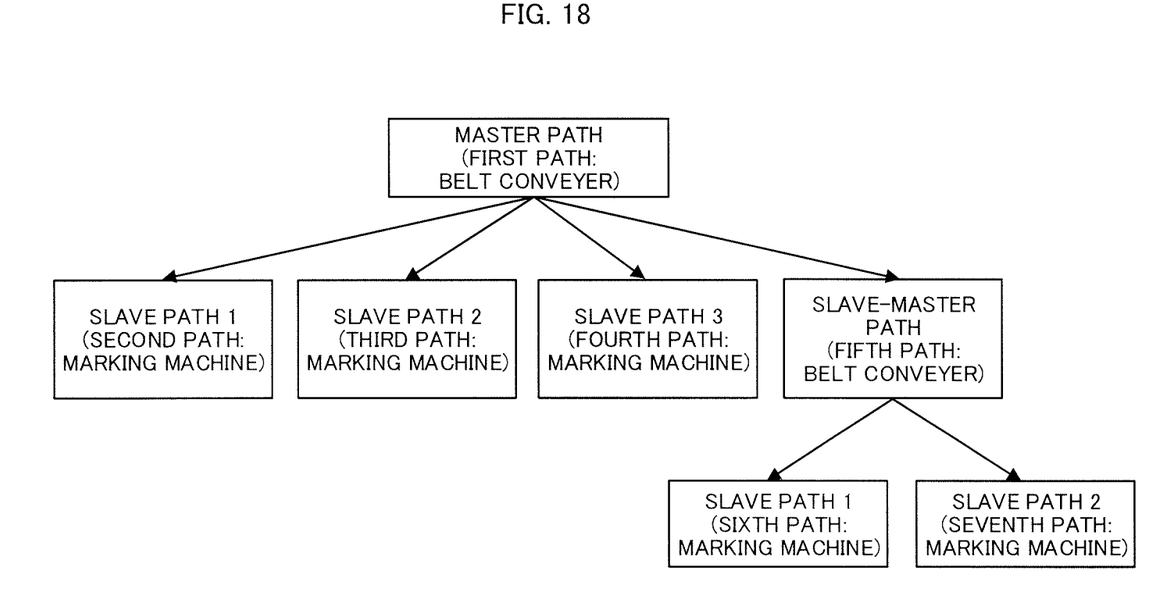
FIG. 18 shows a new path group.

New path group (path group with a multi-layered structure) (see FIG. 18)

Figure 19:
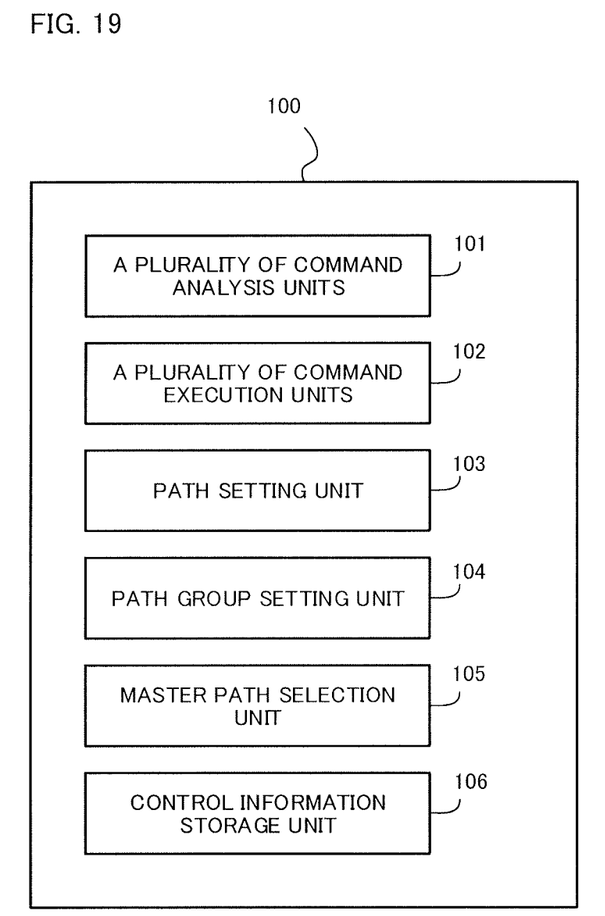
FIG. 19 is a functional block diagram showing a control unit according to an embodiment of the present invention.

FIG. 19 is a functional block diagram showing a control unit according to the embodiment of the present invention. As described above, the control unit 100 includes a plurality of command analysis units 101, which analyze programs, a plurality of command execution units 102, which execute commands based on the analysis result by the plurality of command analysis units 101, a path setting unit 103, which sets a path, a path group setting unit 104, which sets a path group, a master path selection unit 105, which selects a master path, and a control information storage unit 106, which stores master control information.

Figure 20:
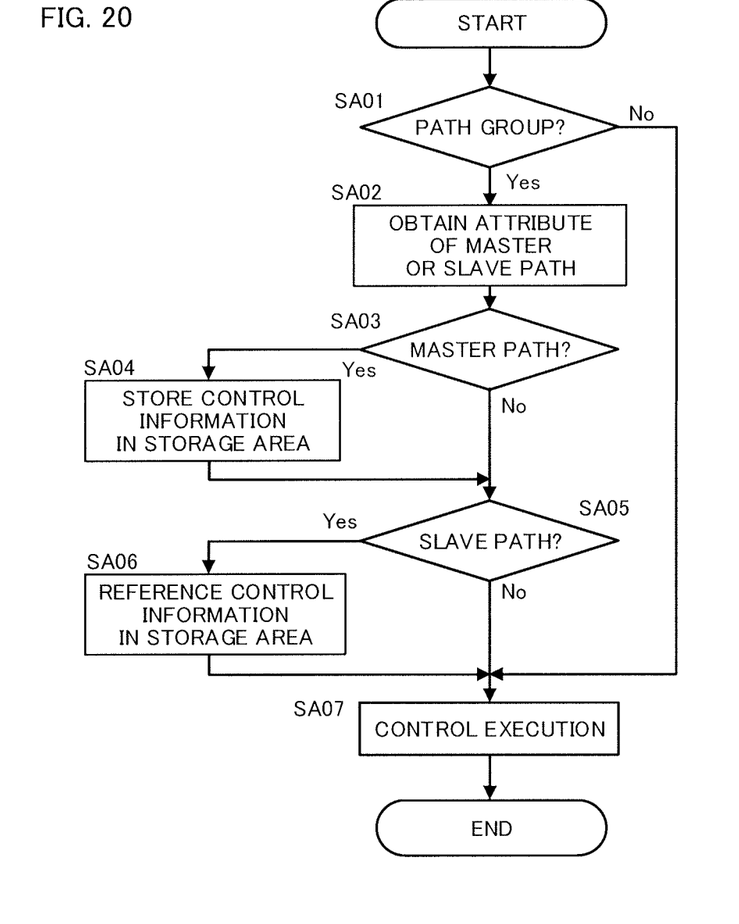
FIG. 20 describes a control flow.

FIG. 20 describes a control flow. When normal control is started, if the control belongs to a path group, the attribute indicating a master path or slave path is obtained. If the path is a master path, control information is stored in the storage area corresponding to the path group number. If the path is a slave path, control is made with reference to the control information of the master path stored in the storage area corresponding to the path group number.

The processing will be described according to the steps.

[Step SA01] At the start of control, determination is made as to whether the path belongs to a path group. If the path does not belong to a path group (No), the processing proceeds to step SA07. If the path belongs to a path group (Yes), the processing proceeds to step SA02.

[Step SA02] Attribute data that determines whether each path is a master path or a slave path is obtained.

[Step SA03] Determination is made as to whether the path is a master path. If the path is a master path (Yes), the processing proceeds to step SA04. If the path is not a master path (No), the processing proceeds to step SA05.

[Step SA04] Control information is stored in the storage area.

[Step SA05] Determination is made as to whether the path is a slave path. If the path is a slave path (Yes), the processing proceeds to step SA06. If the path is not a slave path (No), the processing proceeds to step SA07.

[Step SA06] The control information in the storage area is referenced.

[Step SA07] Control is performed and then the processing is completed.

As described above, the control unit according to the present invention can perform coordinated operation without coordination between the sequence programs even if the system is controlled by a plurality of paths or a plurality of sequence programs.

The invention claimed is:

1. A control unit configured to control a plurality of paths, including a plurality of command analysis units configured to control a machine driven by a motor, a plurality of command execution units configured to execute a command analyzed by the plurality of command analysis units, and a path setting unit configured to set as a path one or more controls of the machine controlled by a program, the control unit comprising:
   a path group setting unit configured to select two or more paths from the plurality of paths and set the two or more paths as a path group;
   a master path selection unit configured to select one path of the path group as a master path, which is referred to as an operation reference, and classify the other paths of the path group as slave paths; and
   a control information storage unit configured to store, as master control information, the program required to control the master path and control data including a signal and a parameter concerning control of the program,
   wherein the slave paths are configured to be controlled with reference to the master control information, so that the slave paths are operated so as to be coordinated with the master path.

2. The control unit according to claim 1,
   wherein the path group setting unit is configured to set and change the path group at an arbitrary timing using a parameter, a signal, or a program.

3. The control unit according to claim 2,
   wherein the master path selection unit is configured to set and change the master path at an arbitrary timing using a parameter, a signal, or a program.

4. The control unit according to claim 2,
   wherein the master path selection unit is configured to form a master-slave multi-layered structure by selecting a master path from a plurality of master paths.

5. The control unit according to claim 1,
   wherein the master path selection unit is configured to set and change the master path at an arbitrary timing using a parameter, a signal, or a program.

6. The control unit according to claim 5,
   wherein the master path selection unit is configured to form a master-slave multi-layered structure by selecting a master path from a plurality of master paths.

7. The control unit according to claim 1,
   wherein the master path selection unit is configured to form a master-slave multi-layered structure by selecting a master path from a plurality of master paths.

\* \* \* \* \*